(12) United States Patent
Gargaro, III et al.

(10) Patent No.: US 8,070,378 B2
(45) Date of Patent: Dec. 6, 2011

(54) CHANNELED TRACK CONNECTOR

(75) Inventors: Nicholas A Gargaro, III, Coon Rapids, MN (US); David M Wendinger, Isanti, MN (US)

(73) Assignee: Nicholas A. Gargaro, III, Coon Rapids, MN (US)

( * ) Notice: Subject to any disclaimer, the term of this patent is extended or adjusted under 35 U.S.C. 154(b) by 360 days.

(21) Appl. No.: 12/317,192

(22) Filed: Dec. 19, 2008

(65) Prior Publication Data

US 2010/0158605 A1     Jun. 24, 2010

(51) Int. Cl.
*B23Q 1/48* (2006.01)

(52) U.S. Cl. ........ 403/381; 403/294; 403/331; 403/355; 403/362; 211/94.01; 248/225.11

(58) Field of Classification Search ............... 403/247, 403/253, 254, 256, 262, 263, 331, 355, 381, 403/362, 294; 211/70.8, 94.01, 162; 248/220.21, 248/223.41, 225.11, 225.21, 58, 322, 324, 248/339, 342; 410/104, 105; 362/648
See application file for complete search history.

(56) References Cited

U.S. PATENT DOCUMENTS

| 559,506 | A | * | 5/1896 | Swain | 269/93 |
|---|---|---|---|---|---|
| 3,574,367 | A | * | 4/1971 | Jankowski | 403/201 |
| 4,132,335 | A | * | 1/1979 | Ingram | 224/324 |
| 4,209,098 | A | * | 6/1980 | Adams | 211/70.8 |
| 4,273,278 | A | * | 6/1981 | Storm | 224/321 |
| 4,406,386 | A | * | 9/1983 | Rasor et al. | 224/321 |
| 4,596,105 | A | * | 6/1986 | Farmer | 52/697 |
| 4,754,905 | A | * | 7/1988 | Bott | 224/326 |
| 4,869,378 | A | * | 9/1989 | Miller | 211/94.01 |
| 5,201,487 | A | * | 4/1993 | Epplett | 248/298.1 |
| 5,617,909 | A | * | 4/1997 | Duginske | 144/253.1 |
| 5,664,793 | A | * | 9/1997 | Engibarov | 279/124 |
| 5,768,966 | A | * | 6/1998 | Duginske | 83/468.7 |
| 6,089,781 | A | * | 7/2000 | Kellberg | 403/381 |
| 6,227,505 | B1 | * | 5/2001 | Van Order et al. | 248/222.13 |
| 6,837,661 | B2 | * | 1/2005 | Schwarz et al. | 411/552 |
| 7,255,511 | B2 | * | 8/2007 | Dolan | 403/403 |
| 7,341,231 | B2 | * | 3/2008 | Zarn | 248/225.11 |
| 7,380,383 | B2 | * | 6/2008 | Olofsson et al. | 52/582.1 |
| 7,401,995 | B2 | * | 7/2008 | Senakiewich, II | 403/374.4 |
| 7,448,523 | B2 | * | 11/2008 | Aftanas et al. | 224/321 |
| 7,517,117 | B2 | * | 4/2009 | Moreland et al. | 362/391 |
| 7,547,170 | B2 | * | 6/2009 | Womack et al. | 410/105 |
| 7,634,875 | B2 | * | 12/2009 | Genschorek | 52/173.3 |
| 7,669,723 | B2 | * | 3/2010 | Kao | 211/70.6 |
| 7,717,278 | B2 | * | 5/2010 | Kao | 211/70.6 |
| 2002/0106240 | A1 | * | 8/2002 | Johnson, Jr. | 403/381 |
| 2005/0067542 | A1 | * | 3/2005 | Zarn | 248/225.11 |
| 2006/0120797 | A1 | * | 6/2006 | Mortensen | 403/331 |
| 2006/0133893 | A1 | * | 6/2006 | Harashima et al. | 403/331 |
| 2010/0290831 | A1 | * | 11/2010 | Burnett et al. | 403/381 |

* cited by examiner

*Primary Examiner* — Michael P Ferguson
*Assistant Examiner* — Eric Chau

(57) ABSTRACT

A channeled track connector having a base and a slider. The slider slides into an key opening in the base. The base includes a first foot for engaging the channeled track. The slider includes a second foot for engaging the channeled track. Each piece standing alone is not engagable to the channeled track. However, when slid together, the base and slider as a whole stands together as one-piece, remains fixed to the channeled track, and serves as a mount for a predefined object.

12 Claims, 4 Drawing Sheets

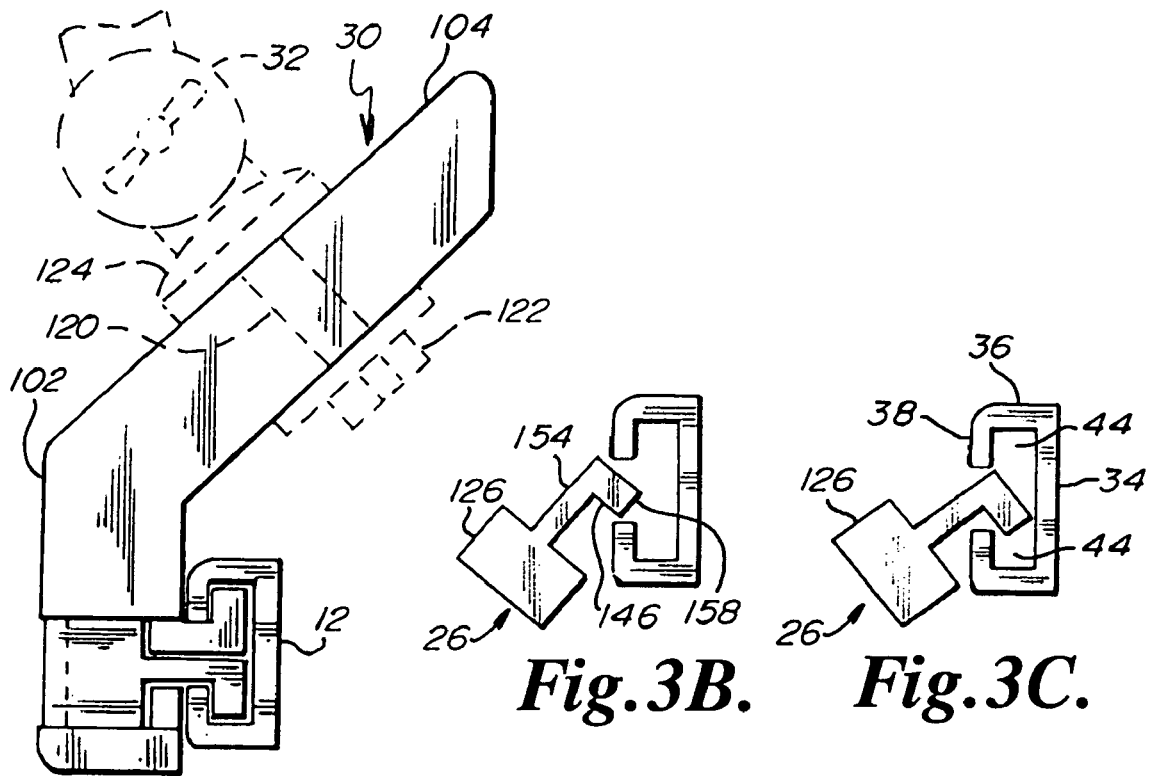
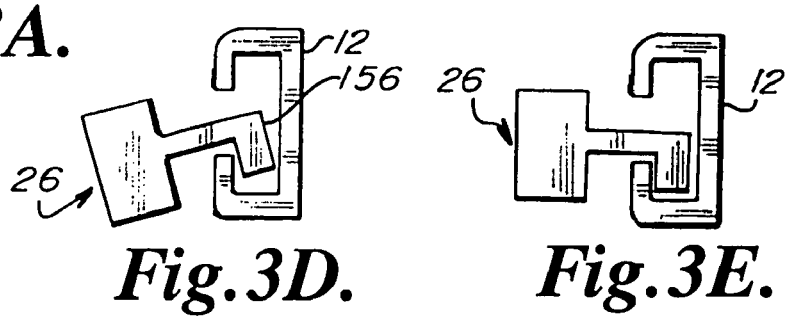
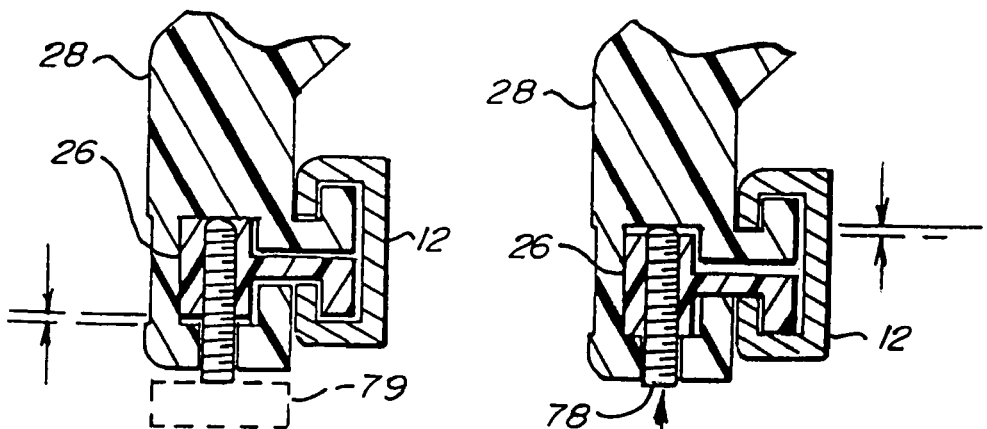
Fig.3A. Fig.3B. Fig.3C. Fig.3D. Fig.3E. Fig.3F. Fig.3G.

CHANNELED TRACK CONNECTOR

FIELD OF THE INVENTION

The present invention generally relates to a connector for a channeled track, more particularly to a two part connector for a channeled track, and specifically to a two part connector for a channeled track where one part slides into and out of the other part to make a connection between the connector, as a whole, and the channeled track.

BACKGROUND OF THE INVENTION

A channeled track is a tool. Objects such as lights may be hung from the channeled track and slid along the track. Fishing apparatus may be mounted on a channeled track and slid along the track. The channeled track is desirably light, rigid and strong. The channeled track can be easily mounted to a variety of surfaces by, for example, simple screws. The channeled track can be an integral portion such as built into the gunwale of a boat.

What is between the channeled track and an object is important. This device, which in the present case is called a connector, is also desirably light, rigid and strong and, further, desirably easy to connect to the channeled track and easy to be adapted to engage any number of objects, not only a bank of lights and a fishing apparatus.

SUMMARY OF THE INVENTION

A feature of the present invention is the provision in a connector for a channeled track having two flanges, of a base and a slider, with the slider being slideable into and out of the base, with the base having a flange receiver for one of the flanges, and with the base and slider in combination making up a flange receiver for the other of the flanges.

Another feature of the present invention is the provision in a connector for a channeled track having two flanges, of a base, with the base having a first flange receiver having opposing faces and an open face, and with the base making up one of the faces of a second flange receiver.

Another feature of the present invention is the provision in a connector for a channeled track having two flanges, of a slider, with the slider making up a portion of a second flange receiver, namely, two faces disposed at a right angle to each other.

Another feature of the present invention is the provision in a connector for a channeled track, of a base and a slider, with the slider being slideable into and out of the base, with the base having a foot for engaging a channel portion, and with the slider having a foot for engaging the opposite channel portion.

Another feature of the present invention is the provision in a connector for a channeled track having two flanges and a space between the flanges, of a base having a first elongate receiver that can be inserted into the space between the flanges directly from a front face of the channeled track, without accessing the channeled track by being inserted in an open end of the channeled track.

Another feature of the present invention is the provision in a connector for a channeled track having two flanges and a space between the flanges, of a slider having at least a portion of a second elongate receiver, with such second elongate receiver portion being insertable into the space between the flanges directly from the front face of the channeled track, without accessing the channeled track by sliding in an open end of the channeled track.

Another feature of the present invention is the provision in a connector for a channeled track, of a base, of a slider slideable into and out of the base, of the base having a first foot for engaging a channel portion, of the slider having a second foot for engaging the other channel portion, and of a threaded pin that engages each of the base and the slider such that the slider is locked relative to the base, where the pin can further draw the slider and base to and away from each other and their respective feet to and away from each other to loosen and lock the connector as a whole to the track.

Another feature of the present invention is the provision in a connector for a channeled track, of a first connector portion having a first foot for engaging a channel portion, of a second connector portion having a second foot for engaging an opposite channel portion, and of the first and second connector portions being incrementally drawable to and away from each other such that the first and second feet are incrementally drawable to and away from each other to place greater and lesser pressure upon the track such that the connector offers greater and lesser resistance to being slid along the track.

Another feature of the present invention is the provision in a connector for a channeled track, of a threaded pin engaging a first portion of the connector and extending in the y-axis direction, of the threaded pin including a proximal end and a distal end, and of the distal end confronting and being spaced from the first foot such that the distal end and first foot can engage therebetween one of the first and second flanges.

An advantage of the present invention is a connector that can slide in a channeled track.

Another advantage of the present invention is a connector that can be fixed at any location in a channeled track.

Another advantage of the present invention is a connector that can be manipulated to slide rather easily or with some resistance in a channeled track.

Another advantage of the present invention is a connector that can be manipulated to slide with incrementally varying degrees of resistance in a channeled track.

Another advantage of the present invention is a connector that can access the channeled track from a front face of the channeled track without going through an open end of the channeled track.

Another advantage of the present invention is a connector that, after being engaged to the channeled track, stays in the channeled track despite great pressure in an effort to force it out frontally.

Another advantage of the present invention is a connector that, after being engaged to the channeled track, can both 1) stay in the channeled track despite great pressure in an effort to force it out frontally, and 2) slide easily axially along the channeled track.

Another advantage of the present invention is a connector that consists essentially of two pieces.

Another advantage of the present invention is a connector that consists essentially of two pieces and a pin.

Another advantage of the present invention is a connector that is easy to install on a channeled track.

Another advantage of the present invention is a connector that is simple to operate.

Another advantage of the present invention is a connector that is inexpensive to manufacture.

Another advantage of the present invention is a connector that is light, rigid and strong.

BRIEF DESCRIPTION OF THE DRAWINGS

FIG. 3A is a detail, partially section, partially phantom view of the connector of FIG. 1B, shows each of the base and slider engaging the channeled track, and shows in phantom the connector mounting a holder for an object where the object is a fishing rod and reel.

FIG. 3B is an end view of the slider and channeled track of FIG. 3A, shows spacing between two flanges of the channeled track, and shows a foot entering the spacing by disposing the slider at an angle.

FIG. 3C is an end view similar to FIG. 3B, shows the foot further into the channeled track, and shows the slider as a whole further approaching a line disposed at a right angle to the channeled track.

FIG. 3D is an end view similar to FIG. 3B, shows the foot still further into the channeled track, and shows the slider as a whole still further approaching a line disposed at a right angle to the channeled track.

FIG. 3E is an end view similar to FIG. 3B, shows the foot yet further into the channeled track and at a position where the foot is engaging one of the flanges of the channeled track, and shows the slider as a whole disposed at a right angle to the channeled track.

FIG. 3F is a detail section view of the connector of FIG. 1B and shows how the pin of FIG. 1C engages the slider and the base to prevent sliding of the slider relative to the base.

FIG. 3G is a detail section view similar to the view of FIG. 3F and shows how the pin of FIG. 1C engages the slider and several portions of the base to draw the base and slider apart to frictionally further engage the base and slider to the channeled track to prevent sliding of the connector as a whole relative to the channeled track.

DETAILED DESCRIPTION

Figure 1A:
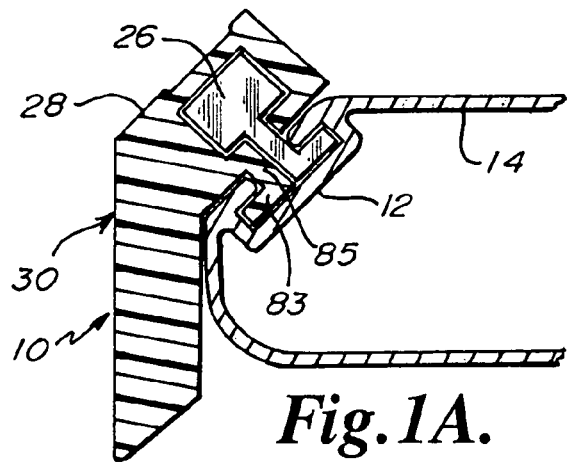
FIG. 1A is an environmental, partially section view of an example of a location for the present channeled track connector where the location is in a boat, shows an integral channeled track on the inner side or gunwale of the boat, shows the present connector engaged to the channeled track, and shows the connector depending from channeled track in a downward direction.

As shown in FIG. 1A, the present channel track connector is indicated by reference numeral 10. Connector 10 is engaged to an integral channeled track 12 of a gunwale 14 of a vessel. A gunwale is nautical term that describes the top edge of the side of a boat, or the widened edge at the top of a side of a boat, or the upper edge of the side or bulwark of a vessel. Integral track 12 of FIG. 1A may or may not have a pair of defined ends and, if so, such defined ends may or may not be open ends. Connector 10 does not require such open ends to connect to such an integral track 12.

Figure 1B:
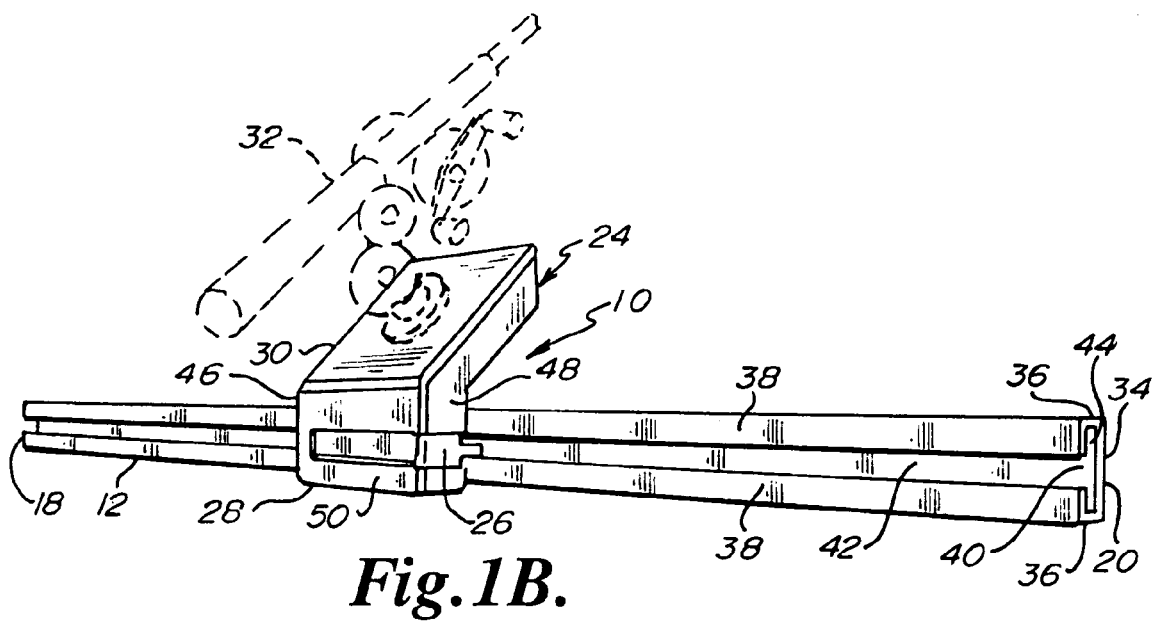
FIG. 1B is a perspective view of the connector of FIG. 1A, shows a partial view in phantom of an example of an object that may be mounted to the connector where the object is a fishing rod and reel, shows an independent channeled track, and shows the connector extending in an upward direction.

FIG. 1B shows an independent track 12 that may be engaged, such as with pin connectors, anywhere so desired, such as to a gunwale of a vessel. Track 12 has a first end 18 and a second end 20. The connector 10 can slide from the first end 18 to the second end 20 or connector 10 can be fixed, via a friction fit, at any location between first end 18 and second end 20.

First end 18 or second end 20, or both, may be closed off. However, connector 10 can be engaged to track 12 from an area in front of track 12 without resorting to pushing in the connector 10 from an opening in ends 18, 20, which ends are conventionally open ends.

As shown in FIGS. 1A and 1B, connector 10 includes two connector portions: a base 24 and a slider 26. Base 24 includes an integral block portion 28 and an integral cantilevered portion 30. Cantilevered portion 30 is a mount or mounting portion for an object 32 such as a cup holder or navigation apparatus in the downwardly extending cantilevered portion 30 of FIG. 1A, or such as a fishing rod and reel in the upwardly extending cantilevered portion 30 of FIG. 1B.

Block portion 28 is elongate and in the elongate or longitudinal direction (x-axis direction) runs parallel to the track 12 and engages track 12. Cantilevered portion 30 is supported at one end (by the block portion 28) and carries a load (object 32, the fishing rod and reel) at generally the other end or along its length.

As shown in FIG. 1B, C-channeled track 12 includes an integral rear 34, a pair of integral sides 36, and a pair of integral flanges 38. The sides 36 extend from the rear 34. Each of the flanges 38 extend from one of the sides 36. The flanges 38 run parallel to the rear 34. The flanges 38 extend toward each other and are spaced from each other. Rear 34, sides 36, and flanges 38 in combination define a T-shaped channel 40. T-shaped channel 40 includes a space or channel portion 42 (disposed immediately between the distal ends of the flanges 38 in a z-axis direction) and a pair of channel portions 44 (disposed in a z-axis direction between sides 36), where each of the channel portions 44 is on the inside of each of the flanges 38. T-shaped channel 40 may be referred to as a navigable route or a route through which connector 10 slides or passes or progresses. The flanges 38 define a front face of the track 12. The rear 34 defines a rear face of the C-channeled track 12. The track 12 is conventionally referred to as a C-shaped channeled track, perhaps because there is a radius to the junction between the flanges 38 and their respective sides 36, as seen, for example, in FIG. 3B. However, it should be noted the channel 40 itself in the track is T-shaped. In other words, "C-shaped" may relate to the hardware or material of the track 12 itself, while "T-shaped" relates to the space or groove or channel 40 in the hardware or material. C-channeled track 12 includes a length or longitudinal direction (the x-axis direction), a lateral direction (y-axis direction), and a normal direction (z-axis direction). The longitudinal (x-axis) direction is defined as the direction between ends 18 and 20. The lateral direction (y-axis) is defined as the direction between the flanges 38 and the rear 34. The normal (z-axis) direction is defined as the direction between sides 36.

Channeled tracks may be integral portions of apparatus. For example, the hardware or material may change such that there is no C-shape, but a T-shaped channel is still present. As to a channeled track formed as part of an extrusion that engages the hull of a boat, the Zarn U.S. Pat. No. 7,341,231 B2 issued Mar. 11, 2008 and entitled Accessory Mounting System For A Boat is hereby incorporated by reference in its entirety.

The block portion 28 of the base 24 is shown in FIGS. 1B, 1C, 2A and 2E, among other figures. Block portion 28 is a block formed of a hard plastic. Block portion 28 includes a longitudinal axis (x-axis), a lateral axis (y-axis), and a normal axis (a z-axis). Block portion 28 includes six sides including 1) a closed end 46 disposed generally in a plane defined by the lateral and normal axes, 2) an open end 48 that is opposite the closed end 46 and disposed generally in a plane defined by the lateral and normal axes, 3) a first or front side 50 disposed generally in a plane defined by the longitudinal and normal axes such that first side 50 runs parallel to the track 12 when the connector 10 is engaged to the track 12, 4) a second rear side 52 disposed generally in a plane defined by the longitudinal and normal axes such that the rear side 52 runs parallel to the front side 50 and confronts the track 12 when the connector 10 is engaged to the track 10, 5) a third or apertured side 54 disposed generally in a plane defined by the longitudinal and lateral axis such that side 54 runs at a right angle to the first and second sides 50, 52, and 6) a fourth side 56 disposed generally in a plane defined by the longitudinal and lateral axes such that side 56 is opposite the third side 54 and runs at a right angle to the first and second sides 50, 52.

Figure 2A:
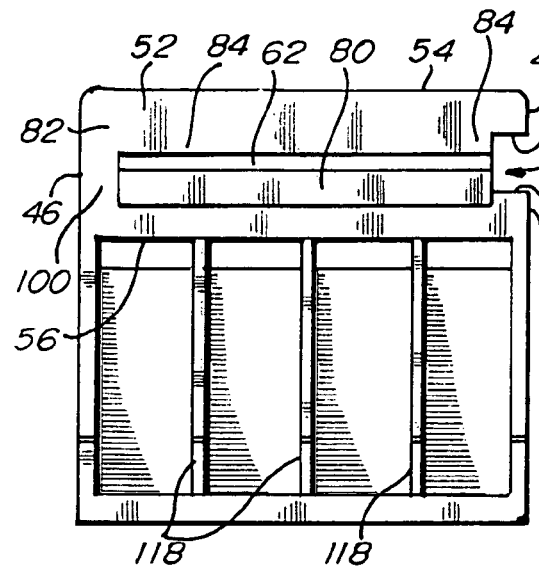
FIG. 2A is a rear elevation view of the base of the connector of FIG. 1B, without the slider engaged in the base.
Figure 2B:
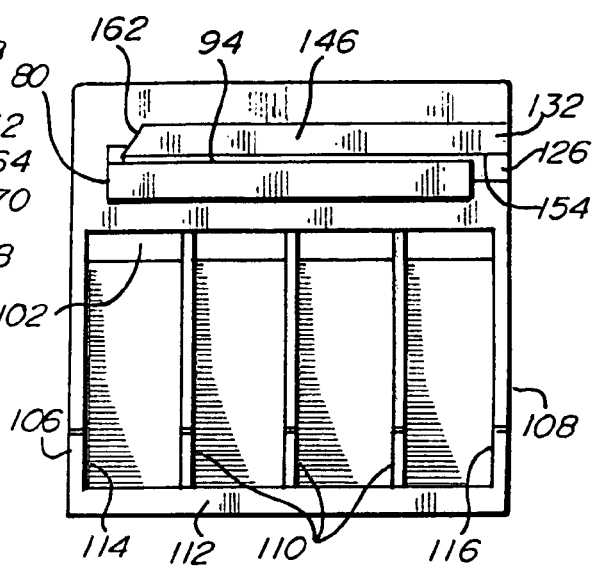
FIG. 2B is a rear elevation view similar to the view of FIG. 2A, with the slider engaged in the base.
Figure 2C:
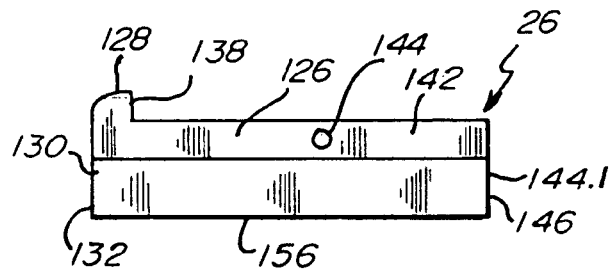
FIG. 2C is a side elevation view of one side of the slider of FIG. 1C.
Figure 2D:
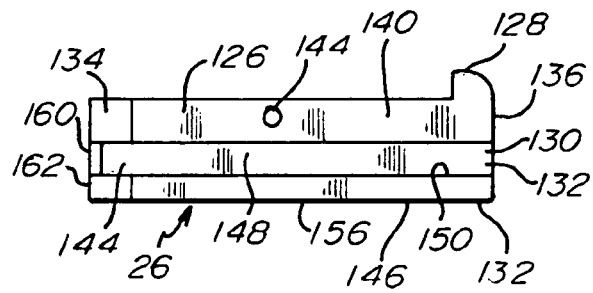
FIG. 2D is a side elevation view of the other side of the slider of FIG. 1C.
Figure 2E:
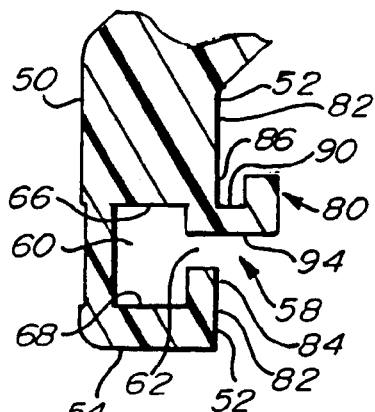
FIG. 2E is a section partial view of the base of the connector of FIG. 1B, without the slider engaged to the base.

As shown in FIG. 2E, block portion 28 includes an elongate key opening 58 running in the longitudinal direction. Key opening 58 includes two portions: an elongate head opening 60 and an elongate neck opening 62. Key opening 58 is accessed via an inlet 64, shown in FIG. 2A. Open end 48 includes the inlet 64. Inlet 64 communicates the key opening 58. Key opening 58, including head opening 60 and neck opening 62, is elongate and extends from inlet 64 to a terminal inside position that confronts the closed end 46, as shown in FIG. 2A.

Each of the head and neck openings 60, 62 is rectangular in shape when viewed in section or from the open end 48. Head opening 60 includes a greater height and width than neck opening 62. In other words, head opening 60 runs a greater distance in the normal direction than neck opening 62, and head opening 60 runs a greater distance in the lateral direction than neck opening 62. Head opening 60 is formed in part by a longitudinally and laterally running inner faces 66 and 68, shown in FIG. 2E.

Figure 1C:
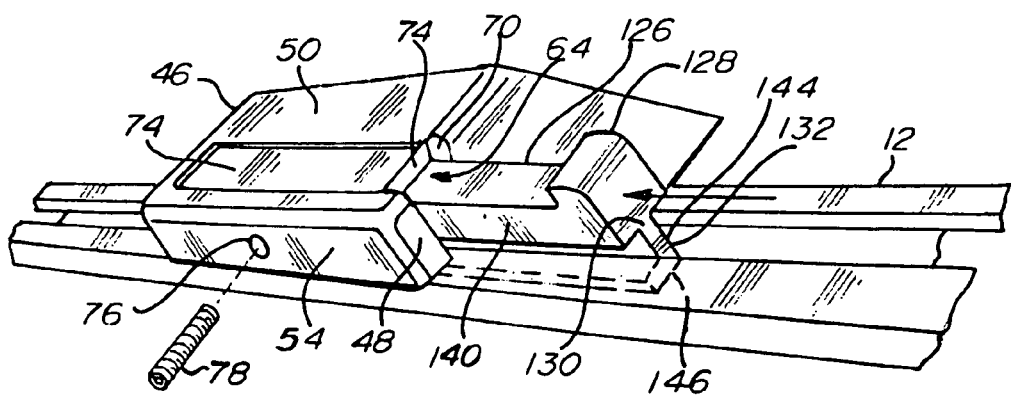
FIG. 1C is a detail, perspective, partially exploded view of the connector of FIG. 1B, shows the slider being slid into the base, and shows how a pin can engage the connector.

As shown in FIG. 2A, inlet 64 is formed in part by opposing faces 70, 72 that run laterally and longitudinally. A portion of face 70 leads into face 66 of head opening 60. A portion of face 72 leads into face 68 of head opening 60. As shown in FIG. 1C, inlet 64 is further formed in part by face or stop 74 running between faces 70, 72. Face 74 runs laterally and normally.

As shown in FIGS. 1B and 1C, block portion 28 includes the first or front side 50. Side 50 runs from closed end 46 to open end 48. First or front side 50 includes a rectangular recessed portion 74 running from a position confronting the closed end 46 to stop 74 where recessed portion 74 leads into or drops off to stop 74. Recessed portion 74 provides a location for a label or tag for a trademark or trade name or for other indicia. Recessed portion 74 also provides a track for running a fingernail to remove the slider 26 from the base 24. Front side 60 is generally rectangular.

As shown in FIGS. 1B and 1C, block portion 28 includes the third or apertured side 54. Side 54 runs from closed end 46 to open end 48. As shown in FIGS. 1C, 3F, and 3G, side 54 includes a threaded hole 76 for a threaded pin 78. Hole 76 is in a medial portion of side 54, intermediate the ends 46 and 48. Hole 76 extends from the outer face of side 54 to the head opening portion 60 of keyed opening 58. Hole 76 communicates with the head opening 60. Threaded pin 78 may be a socket set screw operated by a hex wrench or hex key. Threaded pin 78 may include a thumb grip 79, as shown in FIG. 3F.

As shown in FIGS. 2A, 2B and 2E, block portion 28 of base 24 includes the second or rear side 52. Rear side 52 includes generally three portions: 1) an elongate foot 80 for engaging one of the channel portions 44, 2) the elongate neck opening 62, and 3) a flat face 82 that includes elongate flange receiver portions or faces 84 and 86. Foot 80, in combination with face 86, makes up a first flange receiver 81 for capturing or engaging one of the flanges 81.

Foot or hook 80 extends from and beyond flat face 82. Foot 80 is elongate and runs from a location that confronts open end 48 to a location that confronts the closed end 46. Foot 80 runs parallel to and confronts neck opening 62, as shown in FIG. 2A. As shown in FIG. 1A, foot 80 includes a first elongate bar portion 83 that engages one of the channel portions 44. As further shown in FIG. 1A, foot 80 includes a second elongate bar portion 85 that extends through space 42 and engages, restrains, and confronts the distal end of one of the flanges 38. Bar portions 83 and 85 are integral with each other and in the nature of an angle iron.

In the present case, foot means not merely a "sole" of a foot. Here "foot" means a structure having a general right angle, just like a human foot includes a general right angle. A human foot, by definition, means the terminal part of a leg, below the ankle joint. Such a structure, below the ankle joint, still includes a general right angled structure. It should be noted that a hook is a curved or angular piece of metal or other hard substance for catching, pulling, holding, or suspending something. Foot 80 is in the nature of a hook as well as a foot. This is so because foot 80 not only engages channel portion 44, but also confronts or engages the distal end of one of the flanges 38.

To engage one of the flanges 38 of track 12, first flange receiver 81 includes a first flat face 86 disposed in a plane defined by longitudinal and normal axis, a second flat face 88 that opposes the first flat face 86 and that is also disposed in a plane defined by longitudinal and normal axes, and a third flat face 90 intermediate faces 86 and 88, where face 90 is disposed in a plane defined by longitudinal and lateral axes. Faces 86, 88, 90 define an open front face 92 of the first flange receiver 81.

Foot 80 includes a closed back face 94 disposed in a plane defined by longitudinal and lateral axes. Closed back face 94 forms a portion of neck opening 62. Closed back face 94 is opposite of open front face 92.

Intermediate the open front face 92 and closed back face 94 is a face 96 that confronts the rear 34 of the track 12 and a face 98 that confronts one of the sides 36 of the track 12. Face 96 is disposed in a plane defined by longitudinal and normal axes. Face 96 runs in the normal direction (z-axis direction) for a certain distance, and this distance is preferably slightly less than the distance that space 42 runs in the normal direction (the distance between distal ends of opposing flanges 38 or z-axis direction) such that the foot 80 can be inserted directly into track 12 without tilting the base 24 and without sliding the base 24 into the track 12 from one of the open ends 18, 20 of the track 12.

Flat face 82 runs normally and longitudinally and extends from side 54 to the neck opening 62. Flat face 82 further extends from side 56 to face 90 of receiver 81 so as to include face 86 of flange receiver 81 and be coplanar with face 86 of flange receiver 81. Flat face 82 further includes a portion 100 that runs laterally without interruption from side 54 to side 56. Flat face portion 100 leads into and confronts closed end 46. The elongate flange receiver portion 84 of flat face 82 confronts and receives a front face of one of the flanges 38.

As shown in FIGS. 2A and 2B, block portion 28 of base 24 includes the fourth side 56. Fourth side 56 is an interior side, is flat and is disposed in a plane defined by longitudinal and lateral axes. Fourth side 56 is opposite and parallel to side 54, disposed at a right angle to front side 50, and disposed at a right angle to flat face 82 of rear side 52.

Cantilevered portion 30 of base 24 is integral with block portion 28. As shown in FIGS. 3A, 2A, and 2B, cantilevered portion 30 includes a transition portion 102 that projects from the fourth side 56. Extending obliquely from transition portion 102 is a flat panel 104. Depending at a right angle from panel 104 is an end rib 106. End rib 106 extends from and is integral with closed end 46 of block portion 28. Depending at a right angle from panel 104 is an end rib 108. End rib 108 extends from and is integral with open end 48 of block portion 28. Depending at a right angle from panel 104 are a set of three intermediate ribs 110. Intermediate ribs 110 extend from and are integral with side 56 of the block portion 28. Ribs 106, 108, 110 run parallel to each other. Panel 104 includes an oblique distal edge 112. End ribs 106, 108 include respective oblique distal edges 114, 116. Each of the intermediate ribs 110 includes an oblique distal edge 118. Inner end portions of the ribs 106, 108, 110 extend integrally from side 56 and from transition portion 102 such that cantilevered portion 30 provides a sturdy base for mounting an object 32. As shown in FIG. 3A, a hole 120 may be drilled through panel 104 of cantilevered portion 30 to provide for pin connecting mechanism 122 for a holder 124 for object 32.

Slider or key 26 is an elongate piece of hard plastic. Slider 26 generally includes an elongate head 126 that mates with head opening 60, a stop 128, an elongate neck 130 that mates with neck opening 62, and an elongate foot or hook 132 for engaging one of the channel portions 44. Slider or key 26 is keyed to key opening 58.

Figure 2F:
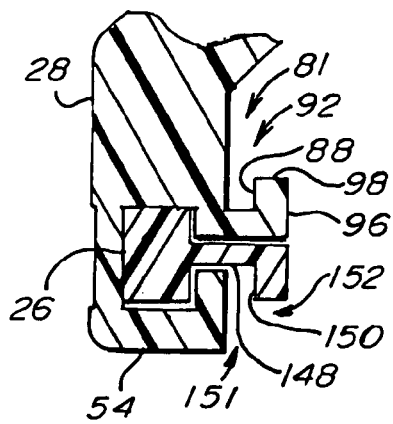
FIG. 2F is a section partial view of the base of the connector of FIG. 1B, with the slider engaged to the base.

Head 126 is shaped so as to slide longitudinally (from closed end 46 to open end 48, referred to as the x-axis) into and out of head opening 60 with minimal lateral movement (from side 50 to side 52, referred to as the y-axis) and with minimal normal (z-axis) movement (from side 54 to side 56). In section, head 126 is a rectangular piece, as shown in FIGS. 2F. Head 126 includes a tapered end 134 and an opposite end 136.

Stop 128 extends in the normal direction from opposite end 136 of head 126. As shown in FIG. 2B, when the slider 26 has been fully slid into the key opening 58, stop 128 and opposite end 136 are fully received into inlet 64 of the block portion 28 while the distal end of the slider 26, including tapered end 134, stops short of the distal end of the neck opening 62. Stop 128 includes a stop edge 138 that abuts stop 74, whereupon slider 26 is fully in block portion 28. Stop edge 138 rises slightly in the normal direction beyond recessed portion 74, to be offset from the face of recessed portion 74, such that a fingernail can slide along recessed portion 74, dig against stop edge 138 and pull slider 26 out of key opening 58.

Head 126 includes a pair of opposing faces 140, 142 extending in the lateral and longitudinal directions. A threaded hole 144 runs through head 126 in the z-axis direction and enters and exits faces 140, 142 intermediate ends 134, 136. When slider 26 has been fully slid into key opening 58, hole 144 is aligned with hole 76 such that threaded pin 78 can be screwed into each of holes 76, 144 at the same time.

Neck 130 depends integrally from head 126. Neck 130 includes a width (distance in the z-axis direction) that is less than the width of head 126 (distance in the z-axis direction). The width of neck 130 is slightly less than the width (distance in the z-axis direction) of neck opening 62 such that there is minimal play in the z-axis direction. The length of neck 130 (distance in the x-axis direction) is the same as the length of head 126.

Neck 130 leads into elongate foot 132. Elongate foot 132 is in the nature of an angle iron having a first bar portion 144.1 disposed at a right angle to a second bar portion 146. Bar portion 144.1 is disposed in a common plane with neck 130.

Elongate foot 132 includes a first flange receiving face 148 on bar portion 144.1. Face 148 runs laterally and longitudinally. Elongate foot 132 includes a second flange receiving face 150 on bar portion 146 that opposes flange receiving face 84 of the base 24. Face 150 runs longitudinally and normally. Flange receiving faces 148 and 150 of elongate foot 132 together with flange receiving face 84 on block portion 28 make up a second flange receiver 151 having an open front face 152 for one of the flanges 38 of track 12. Elongate foot 132 includes a closed back face 154, shown in FIG. 3B. Face 154 runs longitudinally and laterally. Closed back face 154 of elongate foot 132 confronts and slides against closed back face 94 of elongate foot 80 when slider 26 is slid into the base 24, as shown in FIGS. 2B, 2F, 3A and 3F.

Elongate foot 132 further includes face 156, shown in FIG. 3D, and face 158, shown in FIG. 3B. Faces 156 and 158 are disposed at right angles to each other. Face 158 is parallel to and opposite face 154. Face 156 runs longitudinally and normally. Face 158 runs laterally and longitudinally.

As shown in the sequence depicted by FIGS. 3B, 3C, 3D, and 3E, face 156 includes a width (distance in the z-axis direction) that is greater than the width of space 42 (distance between distal ends of flanges 38). While foot 80, having face 96 that is equal to or less than the width of space 42, can engage the track 12 without being tilted along an axis, slider 26 preferably is tilted about the longitudinal axis (x-axis) so as to maneuver bar portion 146 into one of the channel portions 44. Each of foot 80 (of base 24) and foot 132 (of slider 26) can be brought into engagement with track 12 from a front of the track 12. It is not required that the feet 80 and 132 be first engaged via open end 18 or open end 20. If desired, feet 80 and 132 can be first brought into engagement with track 12 through open end 18 or open end 20. As to disengagement, after being slid apart, each of base 24 and slider 26 can be taken directly out of the track 12 in the forwardly direction in the reverse manner of being engaged. If desired, after being slid apart, or while still engaged to each other, base 24 and slider 26 can be slid out of one of the open ends 18, 20.

Like tapered end 134, neck 130 and bar portion 144.1 share a tapered end 160. Bar portion 146 of foot 132 also includes a tapered end 162. The faces of tapered ends 134, 160 and 162 are co-planar and as a whole provide a point or taper to facilitate the entry of slider 26 into inlet 64 and further into key opening 58.

FIG. 3F shows pin 78 screwed into block portion 28 and further into the slider 26 via the holes 76 and 144. Here the slider 26 is locked relative to the block portion 28. Here the connector 10 as a whole can slide with some friction along track 12.

FIG. 3G shows pin 78 screwed into block portion 28, further into the slider 26 via the holes 76 and 144, and yet further such that a head of the pin 78 brings pressure upon inner face 66 of block portion 28. As such pressure is brought to bear, slider 26 and block portion 28 are respectively drawn apart in the normal (z-axis) direction such that feet 80 and 132 are also drawn apart in the normal (z-axis) direction to drive the feet 80 and 132 with greater pressure and into a relatively great friction fit with track 12 such that under normal hand pressure connector 10 cannot be slid or pushed in the longitudinal direction along track 12.

It should be noted that the connector 10 may be manipulated to slide easily along the track 12 or with varying or incremental degrees of resistance along the track 12 or with such a great degree of resistance that under normal hand pressure cannot be made to slide at all. Threaded pin 78 and threaded holes 76 and 44 provide this advantage of incremental resistance. The further the pin 78 is incrementally screwed in, the greater distance the feet 80 and 132 are drawn apart, and the greater the resistance to sliding.

In operation, cantilevered portion 30 is prepared to mount object 32. For example, hole 132 may be drilled through panel 104. Then, the holder 124 and pin connecting mechanism 122 may be engaged to the panel 104. Then, unless already in place, track 12 is engaged at the desired location, such as via screws engaging the rear face 34 of the track 12 and another object, such as a boat or all terrain vehicle. Then either the base 24 or slider 26 may be engaged with the track 12. Base 24 can be held in an orientation such that the x-axis and z-axis plane of the block portion 28 is parallel to the x-axis and z-axis plane of the track 12. In this orientation, foot 80 is pushed through space 42. Then foot 80 is pushed in either of the z-axis directions depending upon the orientation of the open front face 92 of the foot 80. Then, at an axial location different from base 24, the slider 26 is engaged to the track 12 by tilting the slider 26 so as to maneuver foot 132 into the channel 40 and further into channel portion 44. Then, from their different axial locations, one or both of slider 26 and base 24 are slid together such that the slider engages the key opening 58 and is slid fully into the base 24. Then pin 78 can be operated to 1) merely lock slider 26 to base 24 as shown in FIG. 3F and allow the connector 10 as a whole to slide with some ease along the track 12, or 2) draw slider 26 and base 24 apart so as to draw feet 80 and 132 apart so fix under a friction fit the connector 10 as a whole at a particular location on the track 12. Then, object 32 may be secured to holder 124. Connector 10 can be slid in the x-axis direction while object 32 is engaged to the cantilevered portion 30.

It should be noted that track 12 can be oriented in any direction. In other words, track 12 can be placed on a horizontal axis and then spun to be "upside down" or "right-side up" or "sideways" or "tilted." Or track 12 can be placed on a vertical axis and then spun and fixed at any orientation. Or track 12 can be fixed on an oblique axis and then spun and fixed at any orientation. In still other words, track 12 can be fixed at any spin, roll and yaw axis. At any of the above noted orientations, connector 10 can be engaged to the track 12.

It should be noted that the cantilevered portion 30 is merely an example of a mount. Block portion 28 itself may serve as a mount for an object 32. Instead of a cantilevered portion 30, a bank of lights may be engaged to the block portion 28. Instead of a cantilevered portion 30, a ribbed portion may be set in generally the same plane as the blocked portion 28 where, except for the cantilevered feature, ribbed portion is the same as cantilevered portion 30.

It should be noted that first flange receiver 81 is a combination of three faces 86, 88 and 90 (on the block portion 28) and that second flange receiver 151 is a combination of faces 148, 150 (on the slider 26) and face 84 (on the block portion 28).

It should be noted that the present connector 10 preferably and advantageously confronts each of the following faces of the track 12 at the same time by the following portions or faces of the connector 10:

1) the inner face of rear 34 by faces 96 and 156;
2) the inner faces of sides 36 by faces 98 and 158;
3) the inner faces of flanges 38 by faces 88 and 146;
4) the opposing distal ends of the flanges 38 by faces 90 and 148; and
5) the front faces of the flanges 38 by faces 86 and 84.

By confronting all five of the above surfaces, the present connector 10 provides a sturdy and secure engagement to the track 12. By confronting all five of the above surfaces, portions of the connector 10 extend into the channel 44, portions of the connector 10 extend into channel 42, and portions of the connector 10 capture the flange 38 by confronting such on its interior and exterior faces.

It should be further noted that stability is maximized by providing an integral connection between the block portion 28 and the foot 80. That is, the base 24 effectively extends on an integral and one-piece basis to within the channeled track 12.

Figure 4A:
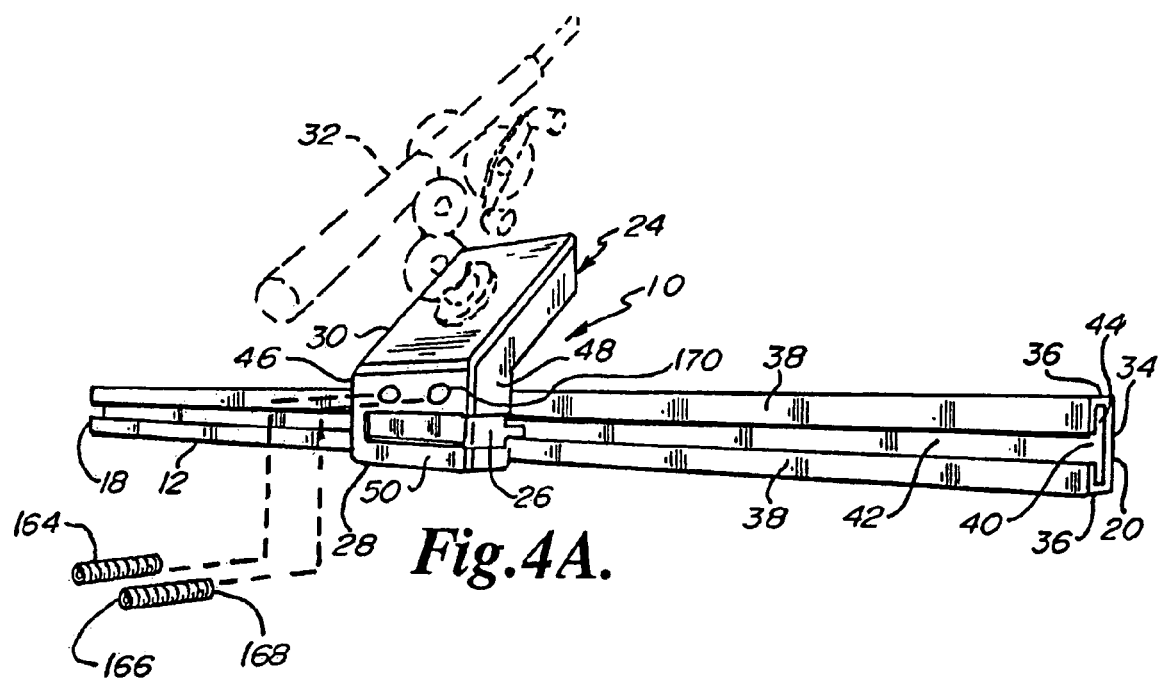
FIG. 4A is a perspective view of the present connector similar to the view of FIG. 1B, where the present connector further includes fine tuning adjustment screws.
Figure 4B:
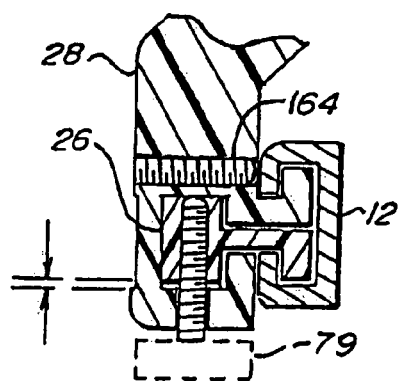
FIG. 4B is a detail section view of the present connector similar to the view of FIG. 3F, where the present connector further includes fine tuning adjustment screws.

FIGS. 4A and 4B show an embodiment of the present connector 10 having a pair of fine adjustment screws 164. Screws 164 may also be referred to as pin connectors or pin connects. Screws 164 are preferably socket set screws operated by a hex wrench or hex key. Screws 164 may include the thumb grip 79, as shown in FIG. 3F. Each of the screws 164 includes a head or proximal end 166 and a distal end 168.

As indicated above, block portion 28 includes sides 50 and 52, with the y-axis direction running from side 50 to side 52. Block portion 28 includes a pair of threaded through holes 170 extending in the y-axis direction, with screws 164 engaging holes 170. Each of the threaded holes 170 opens on each of the sides 50 and 52. The openings of holes 170 on side 52 confront foot 80, including first elongate bar portion 83 that engages one of the channel portions 44. The opening of holes 170 on side 50 are located adjacent to and spaced from recessed portion 74. One of the holes 170 is disposed closer to side 48 than side 46. The other of the holes 170 is disposed closer to side 46 than side 48. The holes 170 are disposed in the x-axis direction relative to each other.

Screws 164 engage the holes 170. When so engaged, distal ends 168 of screws 164 confront and are spaced from foot 80 and confront and are spaced from first elongate bar portion 83 of foot 80. When the foot portion 83 engages one of the channel portions 44, screws 164 are turned in such that the distal ends 168 engage the flange 38 that is associated with such channel portion 44 such that the connector 10 as a whole is more securely fixed to the track 12. Screws 164 are preferably constructed out of nylon, plastic or some other material that will not harm the outside finish of the track or rail 12. It should be noted that the fixing of flange 38 between distal end 168 and foot bar portion 83 is incremental and can be "fine tuned." That is, such fine tuning can permit a) a relatively low sliding resistance of the connector 10 along the track 12 when pressure is exerted in the x-axis direction by the hand of an adult, b) a relatively high sliding resistance of the connector 10 along the track 12 when pressure is exerted in the x-axis direction by the hand of an adult, c) a degree of sliding resistance that is somewhere between the low sliding resistance and high sliding resistance such that the sliding resistance is incrementally adjustable, d) no sliding resistance where the distal end 168 is spaced from the flange 38, or e) an absolute pinch between the screws 164 and foot portion 83 such that connector 10 cannot slide along the track 12, without destroying the structural integrity of the connector 10, when a sliding pressure is exerted in the x-axis direction by the hand of an adult.

Various tracks or rails 12 have manufacturing tolerances and some also have slightly different dimensions. If a connector 10 without screws 164 is designed to fit a particular rail, its potential fit as to other tracks or rails 12 may be minimized. However, with the provision of screws 164, the potential fit of connector 10 as to any particular track or rail 12 is maximized.

Threaded pin 78 extends through the head 126 of the slider 26. Threaded pin 78 includes a distal end or head. Head opening portion 60 of base 24 includes an inner face 66. The distal end or head of the threaded pin 78 brings pressure to bear on the inner face 66 of the head opening portion 60 of the base 24 to draw the base 24 and slider 26 relatively apart and to draw the first and second receivers 81, 151 more tightly against the flanges 38.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

We claim:

1. A connector for a channeled track having a pair of flanges extending toward each other and spaced apart from each other, wherein the connector comprises:
   a) a base, with the base having an opening, with the base having a mount for mounting an object such that the object is connected to the channeled track through the connector;
   b) a slider, with the slider being slideable into and out of the opening of the base;
   c) a first receiver for engaging one of said flanges, with said first receiver comprising first and second opposing faces and an open face such that said first and second opposing faces engage said flange and such that said open face permits entry and exit of said flange, with the base having said first receiver such that said base forms said first opposing face, said second opposing face and said open face of said first receiver such that only said base forms said first receiver, with said mount, said base, said first opposing face and said second opposing face being integral and one-piece; and
   d) a second receiver for engaging the other of said flanges, with said second receiver comprising first and second opposing faces and an open face such that said first and second opposing faces of said second receiver engage said flange and such that said open face of said second receiver permits entry and exit of said flange, with the base having one of said first and second opposing faces of said second receiver and with the slider having the other of the first and second opposing faces of said second receiver, and with the open face of said second receiver confronting each of the slider and the base;
   e) such that, when the slider is engaged in the opening of the base, said second receiver is formed partially by the base and partially by the slider;
   f) such that, when the slider is engaged in the opening of the base, each of the first and second receivers are engaged to the flanges of the channeled track to engage the connector to the channeled track;
   g) wherein the opening includes a head opening portion and a neck opening portion, with the head and neck opening portions communicating with each other, with the head opening portion having a greater width than the neck opening portion, and wherein the slider includes a head and a neck, with the head having a greater width than the neck, with the head mating with the head opening portion and with the neck mating with the neck opening portion such that the opening is a key opening and such that the slider is a key;
   h) wherein the slider includes an axis along which the slider is slideable, with the slider engaging the opening when in the base such that the slider can slide along said axis, and further comprising a threaded pin between the base and the slider that draws, when said threaded pin is turned, the slider along an axis normal to said axis such that the second receiver of the slider is drawn away from the first receiver of the base such that the first and second receivers are drawn more tightly against said flanges to produce a greater friction fit to the channeled track such that sliding of the connector as a whole is minimized; and
   i) wherein the threaded pin extends through the head of the slider, with the threaded pin having a distal end, with the head opening portion having an inner face, with the distal end of the threaded pin bringing pressure to bear on the inner face of the head opening portion to draw the slider and base relatively apart and to draw the first and second receivers more tightly against said flanges.

2. The connector of claim 1, wherein each of the first and second receivers is elongate, wherein each of the first and second receivers includes a closed face opposite to said open face, and wherein said closed faces confront each other after the slider has been engaged in the opening of the base.

3. The connector of claim 1, wherein the neck of the slider extends into and confronts one of the faces of the slider that make up the second receiver.

4. The connector of claim 1 in combination with the channeled track, wherein the channeled track has a normal direction, wherein the channeled track includes a space between said flanges and said space runs a distance in a normal direction, wherein the first receiver includes a normal direction, wherein the first receiver runs a distance in the normal direction, wherein said distance that the first receiver runs in the normal direction is less than the distance that the space runs in the normal direction such that said first receiver can be inserted directly into the channeled track from a front face of the channeled track.

5. The connector of claim 1 in combination with the channeled track, wherein the channeled track has a normal direction, wherein the channeled track includes a space between said flanges and said space runs a distance in the normal direction, wherein the second receiver includes a normal direction, wherein the second receiver runs a distance in the normal direction, wherein said distance that the second receiver runs in the normal direction is greater than the distance that the space runs in the normal direction such that said second receiver is inserted into the channeled track from a front face of the channeled track by tilting the second receiver.

6. A connector for a channeled track having a first channel portion inside of a first flange and a second channel portion inside of a second flange, wherein the connector comprises:
   a) a base, with the base having an opening, with the base having a mount for mounting an object such that the object is connected to the channeled track through the connector;

b) a slider, with the slider being slideable into and out of the opening of the base;
c) a first foot for engaging one of said channel portions, with said base having said first foot and with the base and first foot being integral and one-piece;
d) a second foot for engaging the other of said channel portions, with said slider having said second foot;
e) such that, when the slider is engaged in the opening of the base, each of the first foot and second foot is engaged in the channel portions of the channeled track to engage the connector to the channeled track;
f) wherein the opening includes a head opening portion and a neck opening portion, with the head and neck opening portions communicating with each other, with the head opening portion having a greater width than the neck opening portion, and wherein the slider includes a head and a neck, with the head having a greater width than the neck, with the head mating with the head opening portion and with the neck mating with the neck opening portion such that the opening is a key opening and such that the slider is a key;
g) wherein the slider includes an axis along which the slider is slideable, with the slider engaging the opening when in the base such that the slider can slide along said axis, and further comprising a threaded pin between the base and the slider that draws, when said threaded pin is turned, the slider along an axis normal to said axis such that the second foot of the slider is drawn away from the first foot of the base such that the first and second feet are drawn more tightly against said flanges to produce a greater friction fit to the channeled track such that sliding of the connector as a whole is minimized; and
h) wherein the threaded pin extends through the head of the slider, with the threaded pin having a distal end, with the head opening portion having an inner face, with the distal end of the threaded pin bringing pressure to bear on the inner face of the head opening portion to draw the slider and base relatively apart and to draw the first and second receivers more tightly against said flanges.

7. The connector of claim 6, wherein each of the first and second feet is elongate, wherein each of the first and second feet includes a closed face, and wherein said closed faces confront each other after the slider has been engaged in the opening of the base.

8. The connector of claim 6, wherein the neck of the slider extends into and confronts the second foot.

9. The connector of claim 6 in combination with the channeled track, wherein said first foot includes a width less than the width between said flanges such that said first foot can be inserted directly into the channeled track from a front face of the channeled track.

10. The connector of claim 6 in combination with the channeled track, wherein said second foot includes a width greater than the width between said flanges such that said second foot can be inserted into the channeled track from a front face of the channeled track by tilting said second foot.

11. A connector for a channeled track having a first channel portion inside of a first flange and a second channel portion inside of a second flange, wherein the connector comprises:
a) a first portion having a first foot for engaging one of the channel portions, with the first foot having a closed face, with the first portion having a mount for mounting an object such that the object is connected to the channeled track through the connector; and
b) a second portion having a second foot for engaging the other of the channel portions, with the second foot having a closed face, with the first and second portions oriented such that the closed faces of the feet confront each other, and with the first and second portions being incrementally drawable to and away from each other such that the first and second feet are incrementally drawable to and away from each other to place lesser and greater pressure, respectively, upon the channeled track such that the connector offers lesser and greater resistance, respectively, to being slid along the channeled track such that the first and second feet place greater pressure upon the channeled track when the first and second feet are drawn away from each other;
c) wherein said first portion comprises a base, with the base having an opening, wherein said second portion comprises a slider, with the slider being slideable into and out of the opening of the base;
d) a threaded pin engaging the first and second portions such that the first and second portions are drawable to and away from each other so as to draw the first and second feet to and away from each other;
e) wherein the opening of the base includes a head opening portion and a neck opening portion, with the head and neck opening portions communicating with each other, with the head opening portion having a greater width than the neck opening portion;
f) wherein the slider includes a head and a neck, with the head having a greater width than the neck, with the head of the slider mating with the head opening portion of the base and with the neck of the slider mating with the neck opening portion of the base such that the opening of the base is a key opening and such that the slider is a key;
g) wherein the slider includes an axis along which the slider is slideable, with the slider engaging the opening when in the base such that the slider can slide along said axis, with the threaded pin being between the base and the slider and drawing, when said threaded pin is turned, the slider along an axis normal to said axis such that the second foot of the second portion is drawn away from the first foot of the first portion such that the first and second feet are drawn more tightly against said flanges to produce a greater friction fit to the channeled track such that sliding of the connector as a whole is minimized; and
h) wherein the threaded pin extends through the head of the slider, with the threaded pin having a distal end, with the head opening portion having an inner face, with the distal end of the threaded pin bringing pressure to bear on the inner face of the head opening portion to draw the second portion and first portion relatively apart such that the first and second feet place greater pressure upon the channeled track.

12. The connector of claim 11, wherein the connector has a longitudinal direction, a lateral direction and a normal direction, and further comprising a second threaded pin engaging the first portion and extending in the lateral direction, with the second threaded pin comprising a proximal end and a distal end, with the distal end of the second threaded pin confronting and being spaced from said first foot such that said distal end of the second threaded pin and first foot can engage therebetween one of the first and second flanges.

* * * * *